(12) United States Patent
Tsirkin

(10) Patent No.: US 9,367,345 B1
(45) Date of Patent: Jun. 14, 2016

(54) POWER EFFICIENT CROSS-VCPU NOTIFICATION BY VM FUNCTION

(71) Applicant: Red Hat Israel, Ltd., Raanana (IL)

(72) Inventor: Michael S. Tsirkin, Yokneam Illit (IL)

(73) Assignee: Red Hat Israel, Ltd., Raanana (IL)

( * ) Notice: Subject to any disclaimer, the term of this patent is extended or adjusted under 35 U.S.C. 154(b) by 0 days.

(21) Appl. No.: 14/632,985

(22) Filed: Feb. 26, 2015

(51) Int. Cl.
*G06F 9/455* (2006.01)
*G06F 9/52* (2006.01)

(52) U.S. Cl.
CPC ........ *G06F 9/45558* (2013.01); *G06F 9/45533* (2013.01); *G06F 9/52* (2013.01); *G06F 2009/45583* (2013.01)

(58) Field of Classification Search
CPC .............................. G06F 9/45533; G06F 9/52
USPC ..................................... 718/1, 104
See application file for complete search history.

(56) References Cited

U.S. PATENT DOCUMENTS

| | | | |
|---|---|---|---|
| 7,945,908 B1 * | 5/2011 | Waldspurger ....... | G06F 9/45533 710/260 |
| 8,127,301 B1 | 2/2012 | Waldspurger et al. | |
| 8,166,254 B2 * | 4/2012 | Larson ................ | G06F 11/0712 711/148 |
| 8,423,999 B2 | 4/2013 | Matsumoto et al. | |
| 8,607,009 B2 * | 12/2013 | Nicholas ............... | G06F 9/4418 711/162 |
| 9,251,090 B1 * | 2/2016 | Borthakur ........... | G06F 12/1009 |
| 2007/0112999 A1 | 5/2007 | Oney et al. | |
| 2009/0031304 A1 * | 1/2009 | Song ..................... | G06F 9/5083 718/1 |
| 2010/0223611 A1 * | 9/2010 | Mahalingam ....... | G06F 9/45537 718/1 |
| 2011/0107007 A1 * | 5/2011 | van Riel .............. | G06F 9/45558 711/6 |
| 2011/0161541 A1 * | 6/2011 | Madukkarumukumana | G06F 13/24 710/260 |
| 2012/0278800 A1 * | 11/2012 | Nicholas ............. | G06F 9/45558 718/1 |
| 2013/0227562 A1 | 8/2013 | Tsirkin et al. | |
| 2013/0346966 A1 | 12/2013 | Natu et al. | |
| 2014/0143771 A1 | 5/2014 | Tsirkin et al. | |
| 2014/0173628 A1 | 6/2014 | Ramakrishnan | |
| 2014/0229940 A1 * | 8/2014 | van Schaik ......... | G06F 9/45558 718/1 |

OTHER PUBLICATIONS

Jun Nakajima, "Xen as High-Performance NFV Platform," Xen Project Developer Summit, Intel Corporation, Aug. 18, 2014, [retrieved Nov. 2014],19 pages, Internet: <http://events.linuxfoundation.org/sites/events/files/slides/XenAsHighPerformanceNFVPlatform.pdf>.

Jun Nakajima et al., "Extending KVM Models Toward High-Performance NFV," Intel Corporation, 28 pages, Oct. 14, 2014, [retrieved Nov. 2014], Internet: <http:www.linux-kvm.org/wiki/images/1/1d/01x05-NFV.pdf>.

No Author, "System z Virtualization," International Technical Support Organization for ITD Global, IBM Corporation, ITSO Workshops, 2009, [retrieved Nov. 2014], 188 pages, Internet: ftp://www.redbooks.ibm.com/redbooks/2009_System_z_Workshop_Materials/2009_ITSO_System_z_Virtualization_(zVM and Linux).pdf>.

* cited by examiner

*Primary Examiner* — Phillip H Nguyen (74) *Attorney, Agent, or Firm* — Lowenstein Sandler LLP (57) ABSTRACT

A hypervisor configures a VM function component for execution on behalf of a guest operating system of a virtual machine, the VM function component to send a request to a virtual processor. The hypervisor receives a notification from the source virtual machine to execute the VM function component to send the request to the virtual processor. The VM function component identifies a physical processor associated with the virtual processor, and adds the request to a memory space associated with the physical processor.

20 Claims, 5 Drawing Sheets

POWER EFFICIENT CROSS-VCPU NOTIFICATION BY VM FUNCTION

TECHNICAL FIELD

The present disclosure is generally related to computer systems, and more particularly, to communication between virtual machines in virtualized computer systems.

BACKGROUND

A virtual machine (VM) is a portion of software that, when executed on appropriate hardware, creates an environment allowing the virtualization of an actual physical computer system (e.g., a server, a mainframe computer, etc.). The actual physical computer system is typically referred to as a "host machine," and the operating system (OS) of the host machine is typically referred to as the "host operating system." Typically, software on the host machine known as a "hypervisor" (or a "virtual machine monitor") manages the execution of one or more virtual machines or "guests", providing a variety of functions such as virtualizing and allocating resources, context switching among virtual machines, etc. The operating system (OS) of the virtual machine is typically referred to as the "guest operating system." A virtual machine may comprise one or more "virtual processors" (or VCPUs), each of which maps, possibly in a many-to-one fashion, to a central processing unit (CPU) of the host machine.

A guest OS of a virtual machine can manage multi-threaded applications by apportioning work across multiple VCPUs. While a task is being executed by one VCPU, the guest OS may send a notification to a second VCPU to assist in processing the task. This may involve some form of exit mechanism to the hypervisor to facilitate the cross-VCPU notification by transferring control to the hypervisor.

BRIEF DESCRIPTION OF THE DRAWINGS

The present disclosure is illustrated by way of example, and not by way of limitation, and can be more fully understood with reference to the following detailed description when considered in connection with the figures in which.

DETAILED DESCRIPTION

Described herein are methods and systems for power efficient cross-VCPU notification by a VM function. In a virtualized environment, a guest OS of a virtual machine can manage multi-threaded applications by apportioning work across multiple VCPUs. While a task is being executed by one VCPU, the guest OS may send a notification to a second VCPU (e.g., via an inter-process communication (IPC)) to assist in processing the task (e.g., parallel processing of tasks). This may involve some form of exit mechanism to the hypervisor to facilitate the cross-VCPU notification (by transferring control to the hypervisor) to determine if polling is active for a memory space associated with the physical CPU assigned to the destination VCPU, and if not, interrupting the VCPU to notify it that there are new requests to be processed. The exit mechanism can be inefficient with respect to management of CPU resources since the hypervisor may need to interrupt other CPU tasks to service the notification from the guest.

Aspects of the present disclosure address the above noted deficiency by implementing cross-VCPU notifications via a VM function without using exits to the hypervisor, thereby reducing power usage. A hypervisor may configure a VM function with special privileges to be executed on behalf of a guest operating system of a virtual machine to modify a part of hypervisor memory directly. The VM function, invoked by the guest, can send a request (e.g., an IPC) to a destination VCPU (either within the same VM, to a VCPU within another VM, or directly to the hypervisor) by writing directly to hypervisor memory without requiring an exit to the hypervisor. The polling status of the physical CPU associated with the destination VCPU can be stored in a data structure in memory accessible to the VM function, so that the VM function (executed on behalf of the guest operating system of the virtual machine) may first determine if polling is active or not. If active, the VM function may add the request to the memory space in hypervisor memory for processing by the physical CPU assigned to the destination VCPU without an exit to the hypervisor. The VM function can be configured so that it only issues an exit to the hypervisor if polling is not active.

In an illustrative example, a hypervisor can configure a VM function component for execution on behalf of a guest operating system of a virtual machine to send a request (e.g., an IPC) to a destination virtual processor without an exit to the hypervisor. A VM function component can be a function or other portion of code that is exposed by the hypervisor to the guest operating system of the virtual machine for execution with additional privileges (e.g., modifying portions of hypervisor memory directly without a hypervisor exit). The VM function component may send the request to the destination virtual processor by adding the request to a memory space associated with a physical processor that has been assigned to the destination virtual processor. In certain implementations, adding the request to the memory space can comprise adding the request to a data structure in hypervisor memory associated with the virtual processor that maintains the requests for the virtual processor, adding the virtual processor (e.g., by adding an identifier for the virtual processor) to a data structure in hypervisor memory associated with the physical processor that maintains a list of the active virtual processors for that physical processor, and updating the polling status associated with the physical processor to facilitate waking the physical processor.

The hypervisor may configure the VM function component by providing read access to a table that maps an identifier for the virtual processor to the associated physical processor, read access to a data structure that stores the polling status of the memory space associated with the physical processor, and write access to the memory space associated with the physical processor. The data structure may be updated by the hypervisor whenever polling of the memory space is started (e.g., in response to determining that there are no additional packets in the memory space waiting to be processed, in response to receiving a notification from the virtual processor to begin polling such as by executing a 'mwait' instruction, etc.), or stopped (e.g., in response to determining that there are packets in the memory space waiting to be processed).

Once configured, the hypervisor can supply the VM function component to the guest operating system of the virtual machine for execution. In an illustrative example, the guest operating system of the virtual machine may execute a command to invoke the VM function component (e.g., a VMFUNC command), which can subsequently send a notification to the hypervisor to initiate execution of the VM function component without an exit. The hypervisor can receive the notification from the guest operating system of the virtual machine and subsequently initiate the execution of the VM function component on behalf of the guest operating system of the virtual machine to send the request to the destination virtual processor.

The hypervisor can manage the polling status of any virtual processor associated with a physical processor on the applicable host machine. The hypervisor can store the polling status of the memory space associated with the assigned physical processor in the data structure mentioned above. The hypervisor may enable polling of the memory space upon determining that the execution status of the virtual processor indicates that the virtual processor has become idle (e.g., when the virtual processor executes a 'halt' instruction). The hypervisor may then initiate polling of the memory space for requests to be processed (e.g., by executing an 'mwait' instruction). The hypervisor may first update the polling status in the data structure associated with the memory space to indicate that polling is active, then subsequently initiate polling.

The VM function component, executing on behalf of the guest operating system of the virtual machine, may first identify the physical processor that is associated with the destination virtual processor. In some implementations, the VM function component may identify the associated physical processor by receiving an identifier for the destination virtual processor from the guest operating system of the virtual machine. The identifier may be a unique id that identifies the destination virtual processor. For example, the unique identifier may be the process id of the virtual processor. The VM function component may then determine the physical processor on the host that is associated with the destination virtual processor. The VM function component may make this determination by reading a table within hypervisor memory that maps the unique identifiers of each virtual processor managed by the hypervisor to its associated physical processor. The VM function component may also use this information to identify and subsequently read the data structure to determine the polling address (where the request may be added) and polling status (whether or not polling is active) of the memory space. In some implementations, the mapping table may be separate from the data structure. Alternatively, the mapping table may be combined with the data structure so that the VM function component may obtain the relevant information regarding the memory space when identifying the physical processor.

The VM function component may then add the request from the guest operating system of the virtual machine to the memory space. In certain implementations, the VM function component may check the polling status of the memory space and add the request to the memory space in a single atomic instruction. An atomic instruction is an operation that completes in a single step relative to other threads. Alternatively, the VM function component may add the request to the memory space and subsequently determine the polling status of the memory space using separate instructions. As noted above, the VM function component may use the information stored in the data structure to determine whether polling is active or not for the memory space.

Responsive to determining that polling is active, the VM function component may complete execution without issuing an exit to the hypervisor. The hypervisor may process the request that has been added to the memory space accordingly.

Responsive to determining that polling of the memory space is not active, the VM function component may notify the guest operating system of the virtual machine that polling is not active. The VM function component may notify the guest operating system of the virtual machine via, for example, an interrupt request, a message written to a data structure in a shared memory location, as a return code or status code in response to invoking the VM function component, or in any similar manner. The guest operating system of the virtual machine, responsive to receiving the notification from the VM function component that polling is not active, may subsequently send a notification to the hypervisor that the request has been added to the memory space and the destination virtual processor should be executed by the associated physical processor. The guest operating system of the virtual machine may notify the hypervisor via, for example, sending an interrupt, a message written to a data structure in a shared memory location, or in any similar manner.

Alternatively, responsive to determining that polling of the memory space is not active, the VM function component may notify the destination hypervisor directly (e.g., by executing an 'mwait' instruction, by sending an interrupt to the hypervisor, etc.) that the request has been added to the memory space and the destination virtual processor should be executed by the associated physical processor. If polling is active, the hypervisor can receive and processes any requests placed in the memory space. Upon receiving a request, the hypervisor may terminate polling, execute the virtual processor on its associated physical processor (e.g., by waking the associated physical processor), and the request may subsequently be processed by the virtual processor. Upon determining that there are no additional requests to be processed and the virtual processor becomes idle, the hypervisor may then update the data structure that stores polling status to indicate that polling has been reactivated and subsequently reactivate polling of the memory space.

Aspects of the present disclosure are thus capable of facilitating power efficient cross-VCPU notification via a VM function. More particularly, aspects of the present disclosure can reduce power consumption required for inter-VM communication by eliminating hypervisor exits when sending requests to destination virtual processors.

Figure 1:
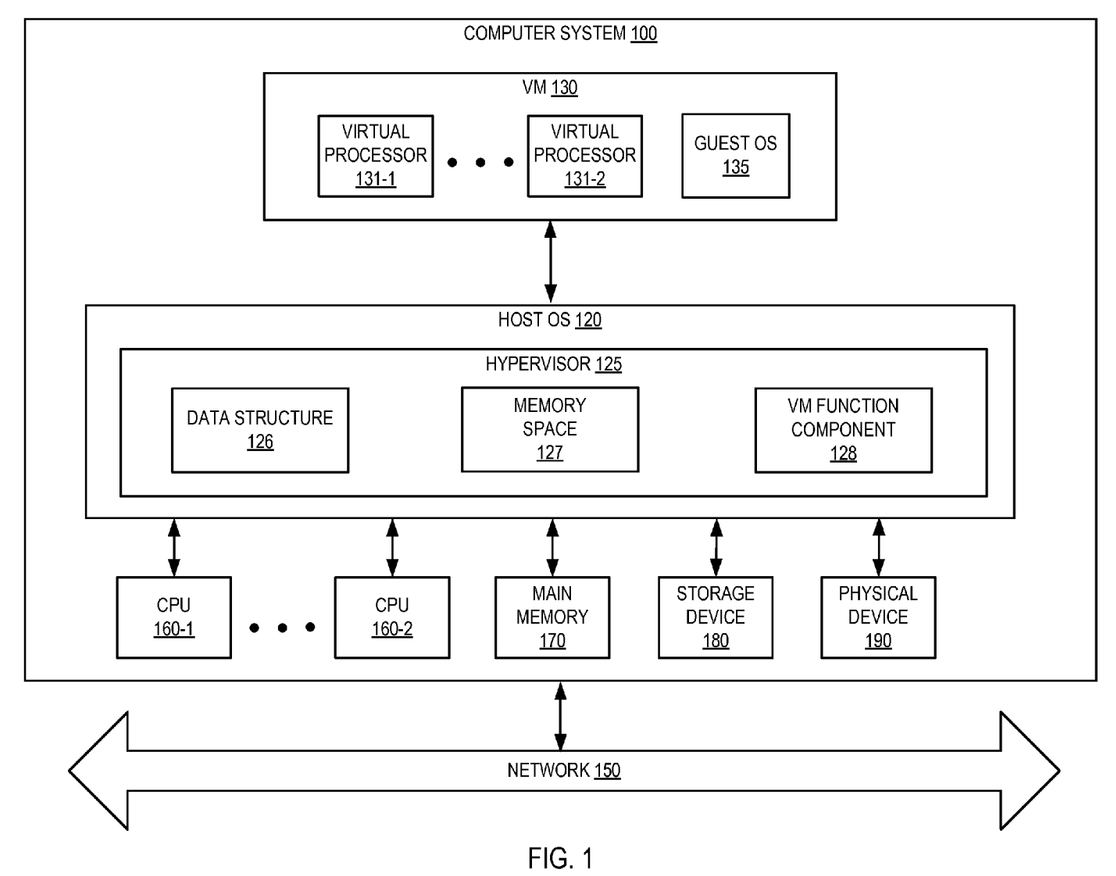
FIG. 1 depicts a high-level component diagram of an example computer system architecture, in accordance with one or more aspects of the present disclosure.

FIG. 1 depicts a high-level component diagram of an illustrative example of a computer system 100, in accordance with one or more aspects of the present disclosure. One skilled in the art will appreciate that other architectures for computer system 100 are possible, and that the implementation of a computer system utilizing examples of the invention are not necessarily limited to the specific architecture depicted by FIG. 1.

As shown in FIG. 1, the computer system 100 is connected to a network 150 and comprises one or more central processing units (CPU) 160, main memory 170, which may include volatile memory devices (e.g., random access memory (RAM)), non-volatile memory devices (e.g., flash memory) and/or other types of memory devices, a storage device 180 (e.g., one or more magnetic hard disk drives, a Peripheral Component Interconnect [PCI] solid state drive, a Redundant Array of Independent Disks [RAID] system, a network attached storage [NAS] array, etc.), and one or more physical devices 190 (e.g., a Peripheral Component Interconnect [PCI] device, network interface controller (NIC), a video card, an I/O device, etc.). In certain implementations, main memory 170 may be non-uniform access (NUMA), such that memory access time depends on the memory location relative to CPU 160.

The computer system 100 may be a server, a mainframe, a workstation, a personal computer (PC), a mobile phone, a palm-sized computing device, etc. The network 150 may be a private network (e.g., a local area network (LAN), a wide area network (WAN), intranet, etc.) or a public network (e.g., the Internet).

It should be noted that although, for simplicity, two CPUs are depicted in FIG. 1, in some other embodiments computer system 100 may comprise a plurality of CPUs. Similarly, in some other embodiments computer system 100 may comprise a plurality of storage devices 180, rather than a single storage device 180.

Computer system 100 may additionally comprise one or more virtual machine (VM) 130 and host operating system (OS) 120. VM 130 is a software implementation of a machine that execute programs as though it were an actual physical machine. Host OS 120 manages the hardware resources of the computer system and provides functions such as inter-process communication, scheduling, memory management, and so forth.

VM 130 may comprise a guest operating system (OS) 135 that handles the execution of applications within the virtual machine, and one or more virtual processors 131. Virtual processor 131 may be associated with a corresponding CPU 160. As shown in FIG. 1, virtual processor 131-1 may be associated with CPU 160-1, and virtual processor 131-2 may be associated with CPU 160-2. It should be noted that although, for simplicity, a single VM 130 is depicted in FIG. 1, computer system 100 may host a plurality VMs 130. Similarly, while only two virtual processors 131 have been depicted in FIG. 1, in some implementations, VM 130 may comprise more than two virtual processors 131.

Host OS 120 may comprise a hypervisor 125, which provides a virtual operating platform for VMs 130 and manages their execution. Hypervisor 125 may comprise data structure 126, memory space 127, and VM function component 128. It should be noted that in some alternative implementations, hypervisor 125 may be external to host OS 120, rather than embedded within host OS 120, or may replace host OS 120.

VM function component 128 can facilitate power efficient notifications between virtual processor 131-1 (e.g., the source virtual processor) and virtual processor 131-2 (e.g., the destination virtual processor) by writing requests to memory space 127 on behalf of VM 130 (and source virtual processor 131-1), as described in detail below with respect to FIGS. 2-4. Memory space 127 can be an area of hypervisor memory to which VM function component 128 may send requests (on behalf of VM 130) that are to be processed by destination virtual processor 131-2.

Hypervisor 125 can use data structure 126 to store information that maps host CPUs to VMs (and VCPUs within the VMs) to enable the hypervisor to determine the polling status of a particular virtual processor 131. In some implementations, data structure 126 may comprise a mapping table that stores a unique identifier for each virtual processor 131 within computer system 100 along with its corresponding assigned CPU 160. Additionally, hypervisor 125 may use data structure 126 to maintain the polling status of memory space 127. Data structure 126 may be a memory location within hypervisor 125. Alternatively, data structure 126 may be written to a location in storage device 180.

Figure 2:
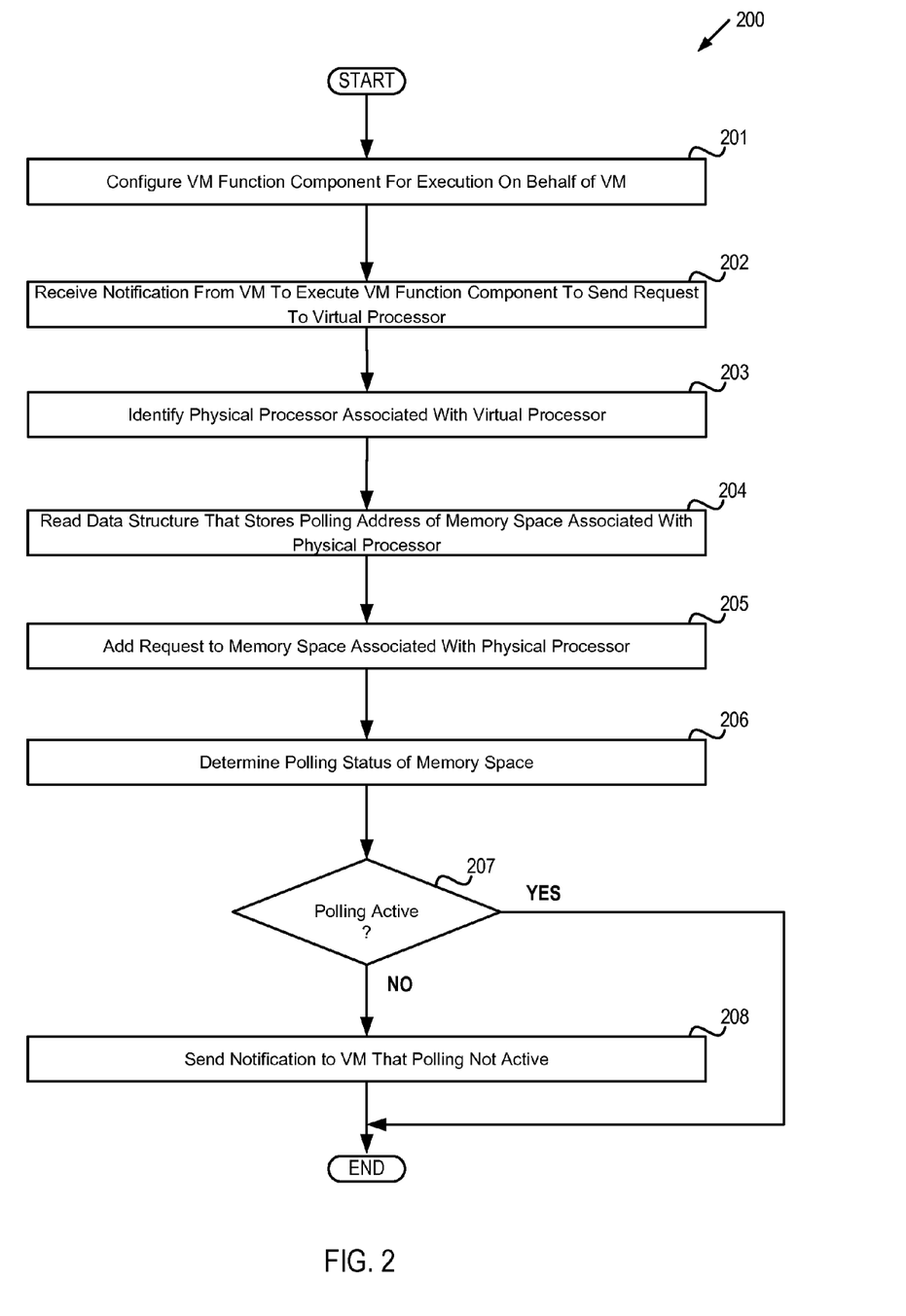
FIG. 2 depicts a flow diagram of a method for power efficient cross-VCPU notification using a VM function, in accordance with one or more aspects of the present disclosure.

FIG. 2 depicts a flow diagram of an example method 200 for power efficient cross-VCPU notification using a VM function. The method may be performed by processing logic that may comprise hardware (circuitry, dedicated logic, etc.), software (such as is run on a general purpose computer system or a dedicated machine), or a combination of both. In one illustrative example, method 200 may be performed by VM function component 128 of hypervisor 125 in FIG. 1. Alternatively, some or all of method 200 might be performed by another module or machine. It should be noted that blocks depicted in FIG. 2 could be performed simultaneously or in a different order than that depicted.

At block 201, processing logic configures a VM function component for execution on behalf of a guest operating system of a virtual machine. The VM function component may be configured to send a request to the memory space that is associated with a destination virtual processor without an exit to the hypervisor. In certain implementations, processing logic may configure the VM function component by read access to a table that maps an identifier for the virtual processor to the associated physical processor, providing read access to a data structure that stores the polling status of the memory space associated with the physical processor, and write access to the memory space associated with the physical processor. The data structure may be updated by the hypervisor whenever polling of the memory space is started (e.g., in response to determining that there are no additional packets in the memory space waiting to be processed, in response to receiving a notification from the virtual processor to begin polling such as by executing a 'mwait' instruction, etc.), or stopped (e.g., in response to determining that there are packets in the memory space waiting to be processed).

At block 202, processing logic receives a notification from the guest operating system of the virtual machine to execute a VM function component to send a request to a destination virtual processor. In an illustrative example, the guest operating system of the virtual machine may execute a command to invoke the VM function component (e.g., a VMFUNC command), which can subsequently send the notification to initiate execution of the VM function component.

At block 203, processing logic identifies the physical processor associated with the destination virtual processor. In some implementations, processing logic may identify the associated physical processor by receiving an identifier for the destination virtual processor from the guest operating system of the virtual machine. The identifier may be a unique id that identifies the destination virtual processor. For example, the unique identifier may be the process id of the virtual processor. Processing logic may then determine the physical processor on the host that is associated with the destination virtual processor. Processing logic may make this determination by reading a table within hypervisor memory that maps the unique identifiers of each virtual processor managed by the hypervisor to its associated physical processor. At block 204, processing logic reads a data structure that stores the polling status of the memory space associated with the physical processor identified at block 203. At block 205, processing logic adds the new request to the memory space associated with the physical processor.

At block 206, processing logic determines the polling status of the memory space according to the contents of the data structure read at block 204. In certain implementations, processing logic may check the polling status and subsequently add the request to the memory space in separate instructions. Alternatively, processing logic can complete both steps in a single instruction. At block 207, processing logic branches based on the polling status of the memory space. If polling is active, the method of FIG. 2 terminates without issuing an exit to the hypervisor. Otherwise, processing logic continues to block 208.

At block 208, processing logic can send a notification to the guest operating system of the virtual machine to indicate that polling is not active. Processing logic may notify the guest operating system of the virtual machine via, for example, an interrupt request, a message written to a data structure in a shared memory location, as a return code or status code in response to invoking the VM function component, or in any similar manner. After block 208, the method of FIG. 2 terminates.

Figure 3:
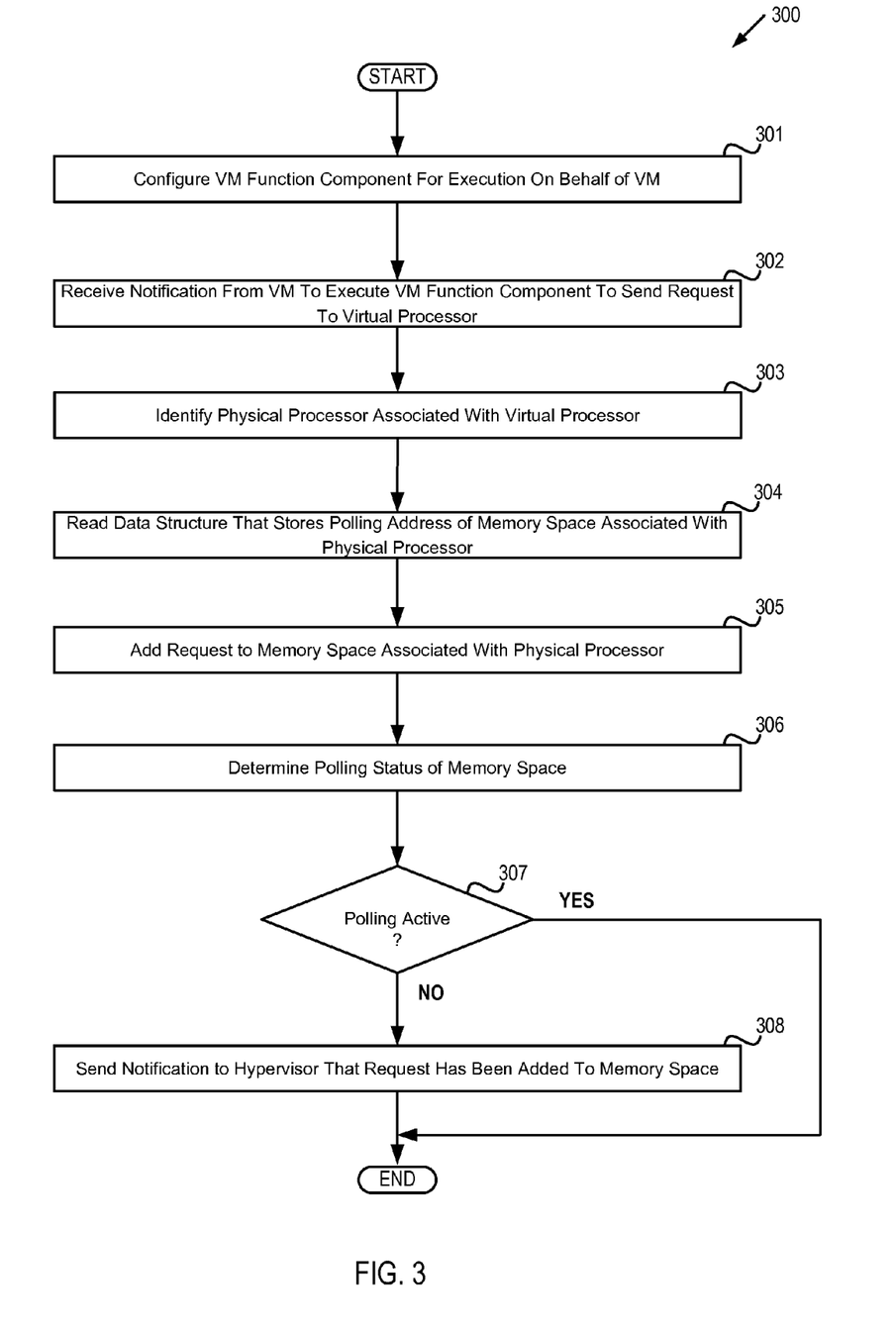
FIG. 3 depicts a flow diagram of a method for power efficient cross-VCPU notification using a VM function, in accordance with one or more aspects of the present disclosure.

FIG. 3 depicts a flow diagram of an example method 300 for power efficient cross-VCPU notification using a VM function. The method may be performed by processing logic that may comprise hardware (circuitry, dedicated logic, etc.), software (such as is run on a general purpose computer system or a dedicated machine), or a combination of both. In one illustrative example, method 300 may be performed by VM function component 128 of hypervisor 125 in FIG. 1. Alternatively, some or all of method 300 might be performed by another module or machine. It should be noted that blocks depicted in FIG. 3 could be performed simultaneously or in a different order than that depicted.

At block 301, processing logic configures a VM function component for execution on behalf of a guest operating system of a virtual machine. The VM function component may be configured to send a request to the memory space that is associated with a destination virtual processor without an exit to the hypervisor. In certain implementations, processing logic may configure the VM function component by read access to a table that maps an identifier for the virtual processor to the associated physical processor, providing read access to a data structure that stores the polling status of the memory space associated with the physical processor, and write access to the memory space associated with the physical processor. The data structure may be updated by the hypervisor whenever polling of the memory space is started (e.g., in response to determining that there are no additional packets in the memory space waiting to be processed, in response to receiving a notification from the virtual processor to begin polling such as by executing a 'mwait' instruction, etc.), or stopped (e.g., in response to determining that there are packets in the memory space waiting to be processed).

At block 302, processing logic receives a notification from the guest operating system of the virtual machine to execute a VM function component to send a request to a destination virtual processor. In an illustrative example, the guest operating system of the virtual machine may execute a command to invoke the VM function component (e.g., a VMFUNC command), which can subsequently send the notification to initiate execution of the VM function component.

At block 303, processing logic identifies the physical processor associated with the destination virtual processor. In some implementations, processing logic may identify the associated physical processor by receiving an identifier for the destination virtual processor from the guest operating system of the virtual machine. The identifier may be a unique id that identifies the destination virtual processor. For example, the unique identifier may be the process id of the virtual processor. Processing logic may then determine the physical processor on the host that is associated with the destination virtual processor. Processing logic may make this determination by reading a table within hypervisor memory that maps the unique identifiers of each virtual processor managed by the hypervisor to its associated physical processor. At block 304, processing logic reads a data structure that stores the polling status of the memory space associated with the physical processor identified at block 303. At block 305, processing logic adds the new request to the memory space associated with the physical processor.

At block 306, processing logic determines the polling status of the memory space according to the contents of the data structure read at block 304. In certain implementations, processing logic may check the polling status and subsequently add the request to the memory space in separate instructions. Alternatively, processing logic can complete both steps in a single instruction. At block 307, processing logic branches based on the polling status of the memory space. If polling is active, the method of FIG. 3 terminates without issuing an exit to the hypervisor. Otherwise, processing logic continues to block 308.

At block 308, processing logic can send a notification directly to the hypervisor to indicate that polling is not active. Processing logic may notify the hypervisor via, for example, executing an 'mwait' instruction, an interrupt request, a message written to a data structure in a shared memory location, as a return code or status code in response to invoking the VM function component, or in any similar manner. After block 308, the method of FIG. 3 terminates.

Figure 4:
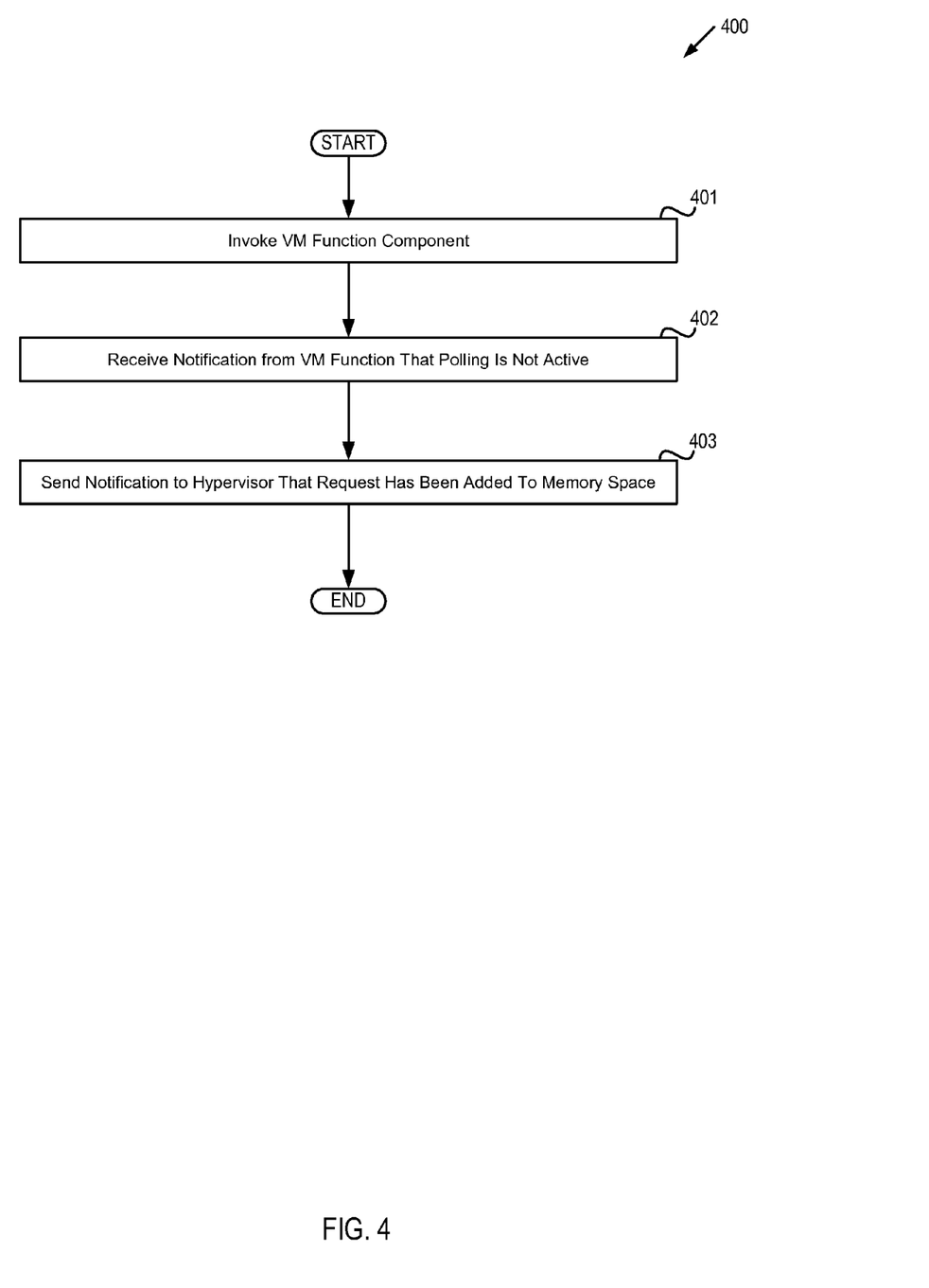
FIG. 4 depicts a flow diagram of a method for power efficient cross-VCPU notification by a VM, in accordance with one or more aspects of the present disclosure.

FIG. 4 depicts a flow diagram of an example method 400 for power efficient cross-VCPU notification by a VM using a VM function. The method may be performed by processing logic that may comprise hardware (circuitry, dedicated logic, etc.), software (such as is run on a general purpose computer system or a dedicated machine), or a combination of both. In one illustrative example, method 400 may be performed by VM function component 128 of hypervisor 125 in FIG. 1. Alternatively, some or all of method 400 might be performed by another module or machine. It should be noted that blocks depicted in FIG. 4 could be performed simultaneously or in a different order than that depicted.

At block 401, processing logic invokes a VM function component. In an illustrative example, the processing logic may execute a command to start the VM function component (e.g., a VMFUNC command), which can subsequently send a notification to the hypervisor to initiate execution of the VM function.

At block 402, processing logic receives a notification from the VM function component that polling of the memory space associated with the physical processor that is assigned to the destination virtual processor is not active. At block 403, processing logic can send a notification to the hypervisor that the request has been added to the memory space. Processing logic may notify the hypervisor via, for example, an interrupt request (e.g., issuing an exit to the hypervisor), a message written to a data structure in a shared memory location, or in any similar manner. After block 403, the method of FIG. 4 terminates.

Figure 5:
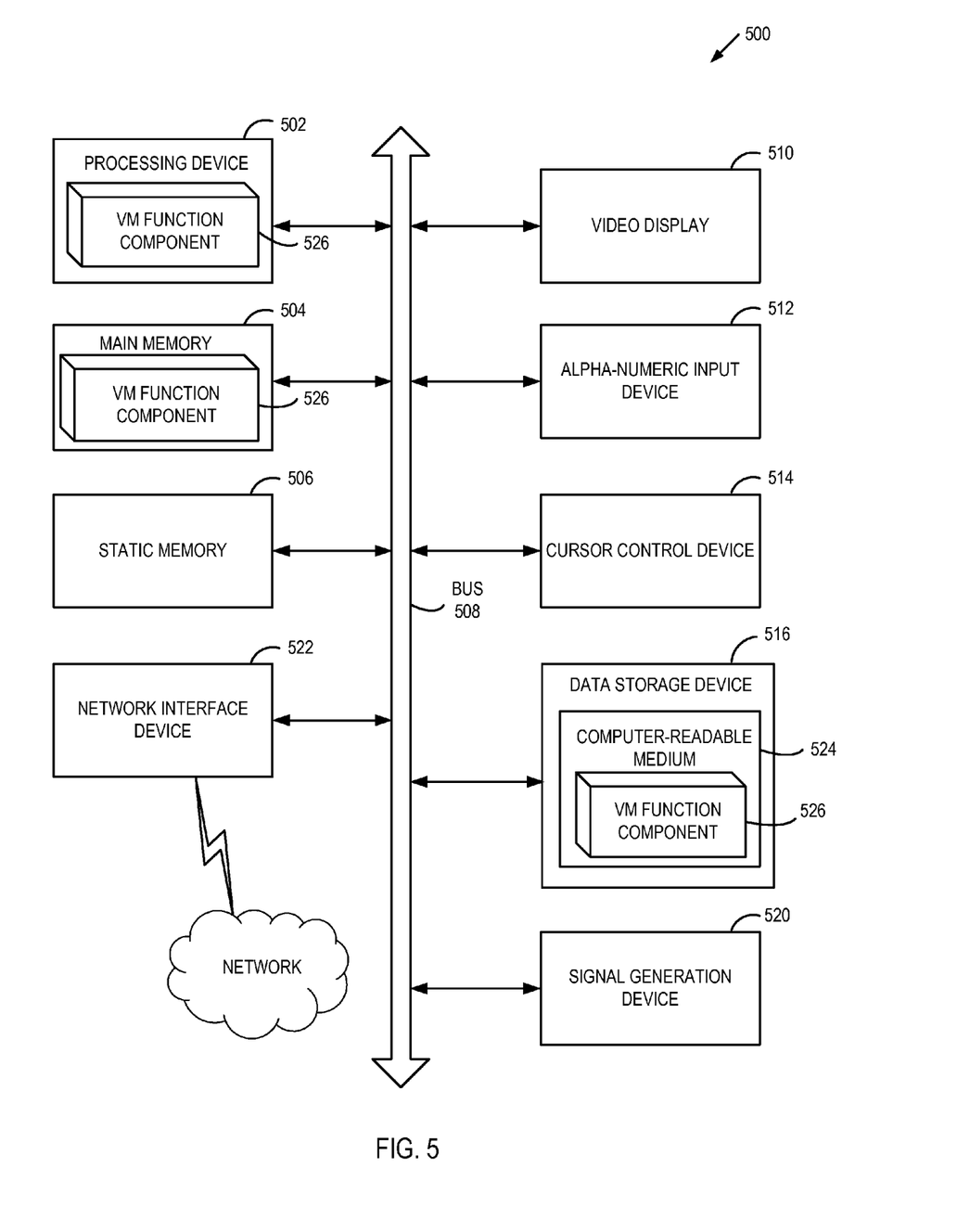
FIG. 5 depicts a block diagram of an illustrative computer system operating in accordance with examples of the invention.

FIG. 5 depicts an example computer system 500 which can perform any one or more of the methods described herein. In one example, computer system 500 may correspond to computer system 100 of FIG. 1. The computer system may be connected (e.g., networked) to other computer systems in a LAN, an intranet, an extranet, or the Internet. The computer system may operate in the capacity of a server in a client-server network environment. The computer system may be a personal computer (PC), a set-top box (STB), a server, a network router, switch or bridge, or any device capable of executing a set of instructions (sequential or otherwise) that specify actions to be taken by that device. Further, while only a single computer system is illustrated, the term "computer"

shall also be taken to include any collection of computers that individually or jointly execute a set (or multiple sets) of instructions to perform any one or more of the methods discussed herein.

The exemplary computer system 500 includes a processing device 502, a main memory 504 (e.g., read-only memory (ROM), flash memory, dynamic random access memory (DRAM) such as synchronous DRAM (SDRAM)), a static memory 506 (e.g., flash memory, static random access memory (SRAM)), and a data storage device 516, which communicate with each other via a bus 508.

Processing device 502 represents one or more general-purpose processing devices such as a microprocessor, central processing unit, or the like. More particularly, the processing device 502 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processing device 502 may also be one or more special-purpose processing devices such as an application specific integrated circuit (ASIC), a field programmable gate array (FPGA), a digital signal processor (DSP), network processor, or the like. The processing device 502 is configured to execute VM function component 526 for performing the operations and steps discussed herein (e.g., corresponding to the methods of FIGS. 2-4, etc.).

The computer system 500 may further include a network interface device 522. The computer system 500 also may include a video display unit 510 (e.g., a liquid crystal display (LCD) or a cathode ray tube (CRT)), an alphanumeric input device 512 (e.g., a keyboard), a cursor control device 514 (e.g., a mouse), and a signal generation device 520 (e.g., a speaker). In one illustrative example, the video display unit 510, the alphanumeric input device 512, and the cursor control device 514 may be combined into a single component or device (e.g., an LCD touch screen).

The data storage device 516 may include a computer-readable medium 524 on which is stored VM function component 526 (e.g., corresponding to the methods of FIGS. 2-4, etc.) embodying any one or more of the methodologies or functions described herein. VM function component 526 may also reside, completely or at least partially, within the main memory 504 and/or within the processing device 502 during execution thereof by the computer system 500, the main memory 504 and the processing device 502 also constituting computer-readable media. VM function component 526 may further be transmitted or received over a network via the network interface device 522.

While the computer-readable storage medium 524 is shown in the illustrative examples to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present invention. The term "computer-readable storage medium" shall accordingly be taken to include, but not be limited to, solid-state memories, optical media, and magnetic media.

Although the operations of the methods herein are shown and described in a particular order, the order of the operations of each method may be altered so that certain operations may be performed in an inverse order or so that certain operation may be performed, at least in part, concurrently with other operations. In certain implementations, instructions or sub-operations of distinct operations may be in an intermittent and/or alternating manner.

It is to be understood that the above description is intended to be illustrative, and not restrictive. Many other implementations will be apparent to those of skill in the art upon reading and understanding the above description. The scope of the invention should, therefore, be determined with reference to the appended claims, along with the full scope of equivalents to which such claims are entitled.

In the above description, numerous details are set forth. It will be apparent, however, to one skilled in the art, that the present invention may be practiced without these specific details. In some instances, well-known structures and devices are shown in block diagram form, rather than in detail, in order to avoid obscuring the present invention.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "receiving," "determining," "configuring," "adding," "providing," "notifying," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present invention also relates to an apparatus for performing the operations herein. This apparatus may be specially constructed for the required purposes, or it may comprise a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various general purpose systems may be used with programs in accordance with the teachings herein, or it may prove convenient to construct more specialized apparatus to perform the required method steps. The required structure for a variety of these systems will appear as set forth in the description below. In addition, the present invention is not described with reference to any particular programming language. It will be appreciated that a variety of programming languages may be used to implement the teachings of the invention as described herein.

The present invention may be provided as a computer program product, or software, that may include a machine-readable medium having stored thereon instructions, which may be used to program a computer system (or other electronic devices) to perform a process according to the present invention. A machine-readable medium includes any mechanism for storing or transmitting information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices, etc.).

The words "example" or "exemplary" are used herein to mean serving as an example, instance, or illustration. Any aspect or design described herein as "example" or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such. Furthermore, the terms "first," "second," "third," "fourth," etc. as used herein are meant as labels to distinguish among different elements and may not necessarily have an ordinal meaning according to their numerical designation.

What is claimed is:

1. A method comprising:
configuring, by a processing device executing a hypervisor, a VM function component for execution on behalf of a guest operating system of a virtual machine, the VM function component to send a request to a virtual processor;
receiving, by the processing device, a notification from the guest operating system of the virtual machine to execute the VM function component to send the request to the virtual processor;
identifying, by the processing device executing the VM function, a physical processor associated with the virtual processor; and
adding, by the processing device executing the VM function component, the request to a memory space associated with the physical processor.

2. The method of claim 1, further comprising:
responsive to determining that polling of the memory space is not active, notifying, by the processing device executing the VM function component, the guest operating system of the virtual machine that polling is not active.

3. The method of claim 1, further comprising:
responsive to determining that polling of the memory space is not active, notifying, by the processing device executing the VM function component, the hypervisor that the request has been added to the memory space.

4. The method of claim 1, wherein configuring the VM function component comprises:
providing read access to a table that maps an identifier for the virtual processor to the associated physical processor;
providing read access to a data structure that stores a polling status of the memory space; and
providing write access to the memory space.

5. The method of claim 4, wherein identifying the physical processor comprises:
receiving the identifier for the virtual processor from the guest operating system of the virtual machine;
reading the table that maps the identifier for the virtual processor to an associated physical processor; and
determining the physical processor associated with the virtual processor using the table.

6. The method of claim 4, further comprising:
determining a polling address of the memory space using the data structure; and
determining the polling status of the memory space using the data structure.

7. The method of claim 2, wherein the guest operating system of the virtual machine is to:
invoke the VM function component; and
responsive to receiving a notification from the VM function component that polling of the memory space associated with the physical processor is not active, send a notification to the hypervisor that the request has been added to the memory space.

8. A computing apparatus comprising:
a memory to store instructions; and
a processing device, operatively coupled to the memory, to execute the instructions, wherein the processing device is to:
receive, by the processing device, a notification from a guest operating system of a virtual machine to execute a VM function component to send a request to a virtual processor;
identify, by the processing device executing the VM function component, a physical processor associated with the virtual processor; and
add, by the processing device executing the VM function component, the request to a memory space associated with the physical processor.

9. The apparatus of claim 8, wherein the processing device is further to:
responsive to determining that polling of the memory space is not active, notify, by the processing device executing the VM function component, the guest operating system of the virtual machine that polling is not active.

10. The apparatus of claim 8, wherein the processing device is further to:
responsive to determining that the polling of the memory space is not active, notify, by the processing device executing the VM function component, a hypervisor that the request has been added to the memory space.

11. The apparatus of claim 8, wherein the processing device is further to:
configure, by the processing device executing the hypervisor, the VM function component for execution on behalf of the guest operating system of the virtual machine, the VM function component to send the request to the virtual processor;

receive an identifier for the virtual processor;
read a table that maps the identifier for the virtual processor to an associated physical processor; and
determine a physical processor associated with the virtual processor using the table.

12. The apparatus of claim 11, wherein to configure the VM function component, the processing device is to:
provide read access to the table that maps the identifier for the virtual processor to the associated physical processor;
provide read access to a data structure that stores a polling status of the memory space; and
provide write access to the memory space.

13. The apparatus of claim 12, wherein the processing device is further to:
determine a polling address of the memory space using the data structure; and
determine the polling status of the memory space using the data structure.

14. The apparatus of claim 9, wherein the guest operating system of the virtual machine is to:
invoke the VM function component; and
responsive to receiving a notification from the VM function component that polling of the memory space associated with the physical processor is not active, send a notification to the hypervisor to notify the virtual processor that the request has been added to the memory space.

15. A non-transitory computer readable storage medium, having instructions stored therein, which when executed by a processing device of a computer system, cause the processing device to:
configure, by the processing device executing a hypervisor, a VM function component for execution on behalf of a guest operating system of a virtual machine, the VM function component to send a request to a virtual processor;
receive, by the processing device, a notification from the guest operating system of the virtual machine to execute the VM function component to send the request to the virtual processor;
identify, by the processing device executing the VM function, a physical processor associated with the virtual processor;
determine a polling address of a memory space associated with the physical processor using a data structure that stores a polling status of the memory space;
determine the polling status of the memory space using the data structure; and
add, by the processing device executing the VM function component, the request to the memory space using the polling address.

16. The non-transitory computer readable storage medium of claim 15, wherein the processing device is further to:
responsive to determining that polling of the memory space is not active, notify, by the processing device executing the VM function component, the guest operating system of the virtual machine that polling is not active.

17. The non-transitory computer readable storage medium of claim 15, wherein the processing device is further to:
responsive to determining that the polling of the memory space is not active, notify, by the processing device executing the VM function component, the hypervisor that the request has been added to the memory space.

18. The non-transitory computer readable storage medium of claim 15, wherein to configure the VM function, the processing device is to:
provide read access to a table that maps an identifier for the virtual processor to the associated physical processor;
provide read access to the data structure that stores the polling status of the memory space; and
provide write access to the memory space.

19. The non-transitory computer readable storage medium of claim 18, wherein to identify the physical processor, the processing device is further to:
receive the identifier for the virtual processor from the guest operating system of the virtual machine;
read the table that maps the identifier for the virtual processor to an associated physical processor; and
determine the physical processor associated with the virtual processor using the table.

20. The non-transitory computer readable storage medium of claim 16, wherein the guest operating system of the virtual machine is to:
invoke the VM function component; and
responsive to receiving a notification that polling of the memory space associated with the virtual processor is not active, send an interrupt to the hypervisor to begin polling.

* * * * *